United States Patent Office 3,441,513
Patented Apr. 29, 1969

3,441,513
LIQUID CRYSTAL COMPOSITIONS
Wayne E. Woodmansee, Seattle, Wash., assignor to The Boeing Company, Seattle, Wash., a corporation of Delaware
Filed Aug. 5, 1966, Ser. No. 570,617
Int. Cl. G01k 11/16
U.S. Cl. 252—408                           18 Claims

ABSTRACT OF THE DISCLOSURE

Cholesteric liquid crystal materials exhibiting selective light scattering over characteristic temperature ranges having a first component providing color sensitivity at a relatively low temperature of cholesteryl oleate, a second component which narrows the temperature response to a small range of temperatures for the occurrence of the color phenomena selected from the group consisting of cholesteryl nonanoate, cholesteryl decanoate, cholesteryl octanoate, and cholesteryl paranitrobenzoate; and a third component which adjusts the actual temperature at which the color phenomeana occur selected from the group consisting of cholesteryl acetate and cholesteryl propionate. A fourth filler component providing increased visibility of the color patterns may be added selected from the group consisting of carbon, carbon black, black tempera powder, and finely divided metals and nonmetals. These cholesteric materials may be sandwiched between transparent plastic films for efficient handling and application.

---

Figure 1:
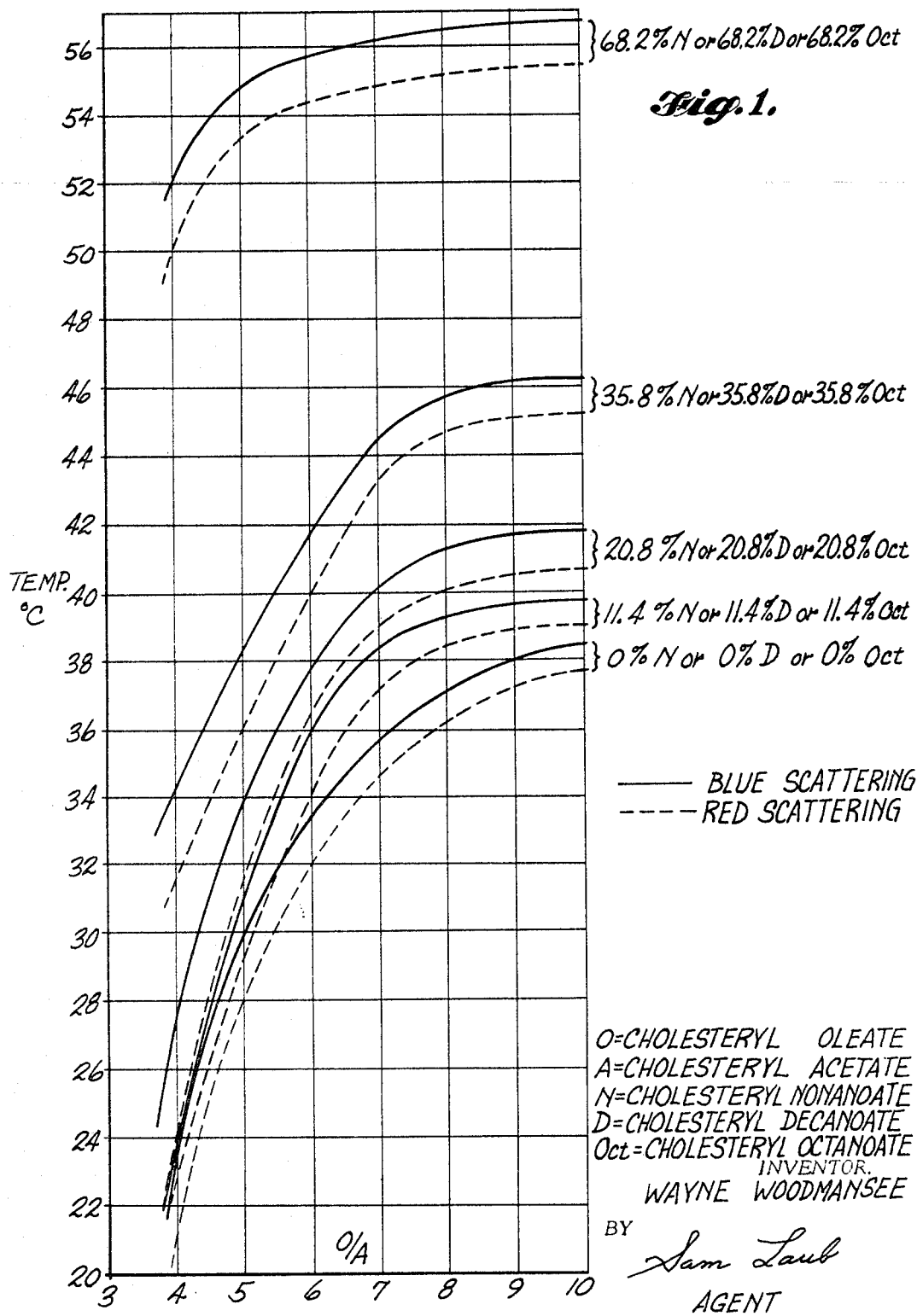

This invention relates to cholesteric compositions having improved temperature sensitive properties. In greater detail, this invention relates to a series of compositions of cholesteric materials of two or more components which have increased sensitivity in temperature responsive color patterns.

While temperature sensitive cholesteric materials have been known for their properties since the turn of the century, recent interest has been generated in these materials for their prospective use in nondestructive testing and related applications. A reference indicating the current state of the art in cholesteric materials is U.S. Patent No. 3,114,836; from this reference, it is seen that various cholesteric materials and compounds thereof are known to the art. In particular, two component and three component mixtures have been investigated for their temperature sensitivity patterns.

Some drawbacks associated with presently available temperature indicating media of cholesteric materials are poor conductivity of the underlying black paint backings used as absorbents of light. These backings also introduce contamination problems in the cholesteric materials and result in a lack of flexibility of the composite structure. Application and drying of the underlying absorptive paint serving as a backing greatly increases the time needed for thermal testing of large surface areas. Removal of the black paint following testing also raises problems in testing components where cleanliness is mandatory.

In order to further promote use of cholesteric materials for surface temperature indications for thermal nondestructive testing of materials and related applications, such as the signboard industry, it is essential that the materials be quickly applied and removed, and the temperature-related property change, as shown by a color phenomenon, be rapid and occur over a small temperature range.

Mixtures of liquid crystal materials, principally derivatives of cholesterol, have been prepared which scatter light at different wave lengths depending upon the temperature sensitive properties of the particularly derivative of cholesterol being employed. The temperature range over which the color change is experienced is variable depending upon the particular mixture being employed. I have experienced transitions from red to yellow to green to blue over approximately 1° C. in the temperature range of 20° C. to 60° C. The temperature transition, which is completely reversible, from red through blue takes less than one second.

The optical properties of cholesteric materials should be emphasized. White light normally incident upon a cholesteric film over a black backing is selectively scattered at various wave lengths depending upon the composition, temperature, and angle at which the film is viewed. The scattering process permits a viewer to determine the temperature of a cholesteric film by observing the colors associated with the wave length of the principal scattering. The wave lengths which are not scattered are transmitted by the film and are absorbed by black film underlying the cholesteric materials as conventionally employed. This enhances the intensity of the scattered colors. I have found that the transmitted wave lengths may also be effectively absorbed by adding a finely divided dark substance to the cholesteric film. These particles absorb the transmitted light but do not appreciably influence the scattering phenomenon. The net result is that a person sees the same color for the cholesteric film as before, but the drawbacks associated with using a black backing (paint layer) are eliminated.

In light of the foregoing, it is the primary object of this invention to enhance the applicability of cholesteric materials to temperature visualization applications.

It is an additional object of this invention to achieve cholesteric compositions of two or more components which exhibit the advantages of the foregoing object.

It is a further object of the instant invention to facilitate application, temperature visualization and removal of cholesteric compositions thus enhancing their utilization in nondestructive testing, medical applications, sign displays and various toy products.

Further objects and applications of the instant invention will be readily apparent to those skilled in the art from a reading of the following specification, the claims annexed thereto, with references to the accompanying drawings, wherein:

FIGURE 1 shows the color transitions over a temperature range of various cholesteric compositions comprising combinations of cholesteryl oleate, cholesteryl acetate, and cholesteryl nonanoate; further combinations of cholesteryl oleate, cholesteryl acetate and cholesteryl decanoate; and further combinations of cholesteryl oleate, cholesteryl acetate and cholesteryl octanoate.

Figure 2:
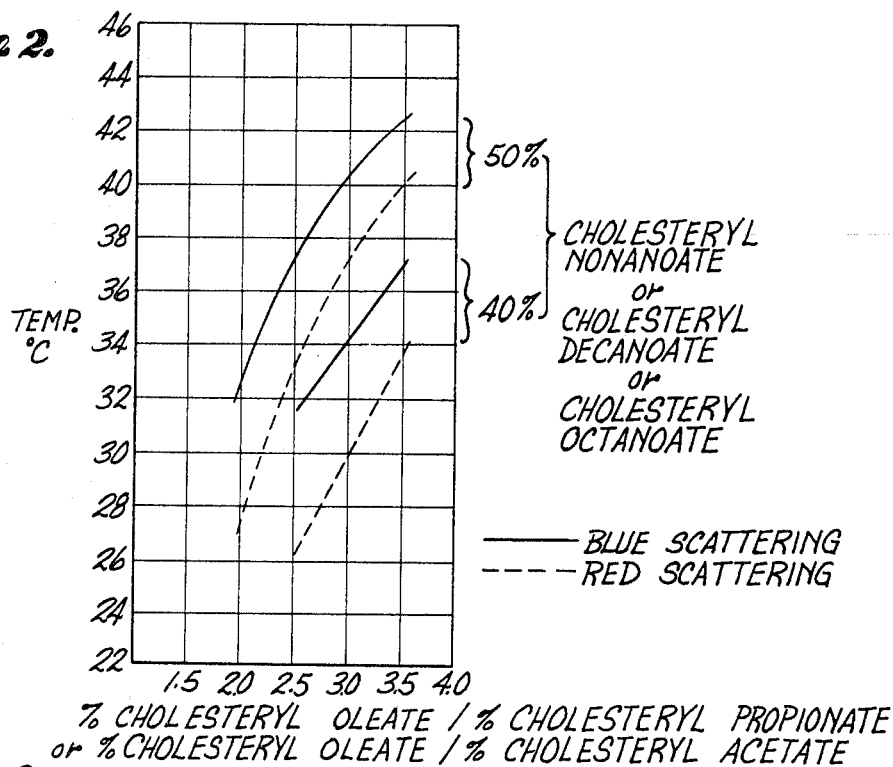

FIGURE 2 depicts the color transitions over a temperature range of various cholesteric compositions comprising combinations of cholesteryl oleate, cholesteryl propionate and cholesteryl nonanoate; further combination of cholesteryl oleate, cholesteryl propionate and cholesteryl decanoate, further combinations of cholesteryl oleate, cholesteryl propionate and cholesteryl octanoate; further combinations of cholesteryl oleate, cholesteryl acetate and cholesteryl nonanoate; further combinations of cholesteryl oleate, cholesteryl acetate and cholesteryl decanoate; and further combinations of cholesteryl oleate, cholesteryl acetate and cholesteryl octanoate.

Figure 3:
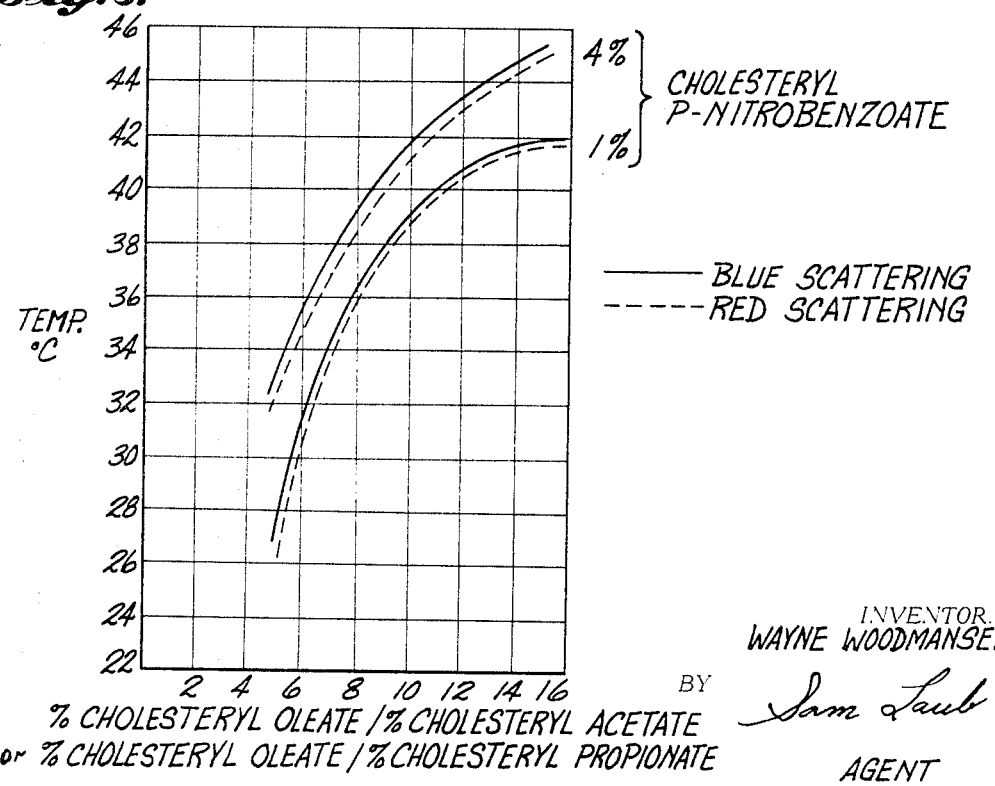

FIGURE 3 shows the color transitions over a temperature range of various cholesteric compositions comprising a combinations of cholesteryl oleate, cholesteryl acetate and cholesteryl paranitrobenzoate, and further combinations of cholesteryl oleate, cholesteryl propionate and cholesteryl paranitrobenzoate.

Figure 4:
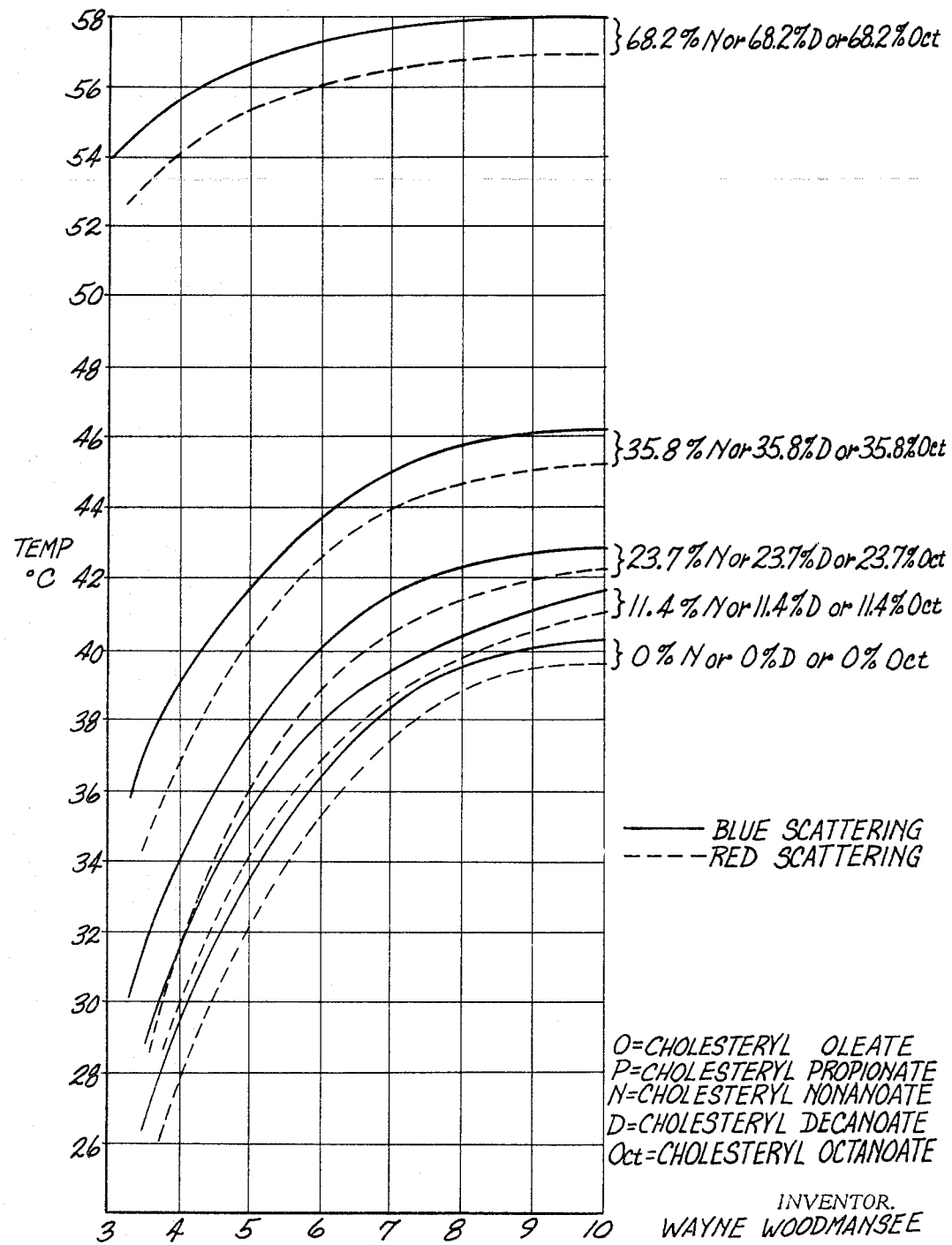

FIGURE 4 sets forth the color transitions over a temperature range of various cholesteric compositions comprising combinations of cholesteryl oleate, cholesteryl propionate and cholesteryl nonanoate; further combinations of cholesteryl oleate, cholesteryl propionate and cholesteryl decanoate; and further combinations of cholesteryl oleate, cholesteryl propionate and cholesteryl octanoate.

It should be noted that similarly responding compositions have been graphed on the same figure with alternative desginations being set forth.

Testing of adhesively bonded structures is conveniently carried out with filled cholesteric liquid crystals. A filled cholesteric liquid is a composition of cholesterol which has incorporated and dispersed therein various other substances. The test surface is initially warmed to facilitate spreading of the cholesteric film. The filled material is then brushed or sprayed (with approximately 10% benzene added) onto the surface and brushed until a uniform color pattern is observed when the surface is slowly heated to a temperature to which the cholesteric material responds. The bonded structure is then rapidly cycled through the range of temperature to which the cholesteric materials respond. Heating is generally accomplished with a bank of 1000 watt photoflood lamps positioned to provide even heating of the test surface. The intensity of the lamps is controlled by variable autotransformers. Convective cooling is used to lower the temperature of the panel following application of heat from the flood lamps. As the bonded panel is quickly heated and cooled, voids, lack of adhesive and other flaws are revealed as temperature anomalies which produce a color contrast over the flaw. These local temperature differences arise due to variations in the thermal diffusivity of the bonded structure in the vicinity of the bonding irregularity as compared with the more uniform thermal properties of well-bonded regions. Bonding flaws may then be outlined on the surface with a marking device and/or the cholesteric temperature pattern photographed to obtain a permanent record. Following testing, the cholesteric materials and filler are removed by cleaning the surface with a flexible rubber scraper. The last traces of the cholesteric materials are removed by wiping with a rag containing benzene.

Cholesteric liquid crystal mixtures suitable for temperature visualization over a given range are prepared by initially purifying the constituents by recrystallization from hot ethanol or by washing with ethanol at room temperature if the raw materials are relatively pure. The necessary percentages of the various constituents are selected from graphs similar to FIGURES 1 through 4 to achieve light scattering at the desired temperatures. The solid compounds combined in these mixtures are weighed to 0.1% and mixed in a suitable container which is then heated to approximately 80° C. The mixture is stirred continuously for at least 10 minutes. Filler material is then added to the liquid crystals and stirring continued for an additional 10 minutes to insure intimate mixing of the filler and cholesteric materials. Upon cooling, the filled cholesteric materials are stored at approximately 0° C. or in an evacuated container at room temperature. These storage procedures are effective in stabilizing the color temperature behavior of the mixtures for several weeks.

Experimentation with the properties of cholesteric materials led to a number of combinations of chemicals which show desirable properties of viscosity, speed of response, temperature sensitivity, and reversible color-temperature behavior.

I have found that a three component composition of selected constituents will offer the sensitivity needed in cholesteryl materials. The cholesteryl compositions I have found have a basic component providing sensitivity by color change at low relative temperature (approximately 0° C. to 60° C.—a normal testing temperature range for employing cholesteryl materials) in the presence of a second component which has the function of narrowing temperature response to a small range of temperature for the occurrence of the color phenomena (red to blue transition in 1° C.) with a third component being added to adjust the actual temperature at which the color phenomena will occur.

I have found that the basic component can be selected from the group consisting of cholesteryl oleate, the second component can be selected from the group consisting of cholesteryl nonanoate, cholesteryl decanoate, cholesteryl octanoate and cholesteryl paranitrobenzoate, and the third component can be selected from the group consisting of cholesteryl acetate and cholesteryl propionate.

The color-temperature behavior of a series of mixtures of cholesteryl nonanoate, cholesteryl oleate, and cholesteryl acetate are shown in FIGURE 1. By varying the percent of cholesteryl nonanoate and/or the amounts of cholesteryl acetate and oleate, a mixture of materials can be derived which scatters light selectively over the temperatures demonstrated in the curves. The amounts of the various constituents found to produce light scattering over useful temperature increments are:

|  | Percentage by wt. |
|---|---|
| Cholesteryl nonanoate | 0 to 70 |
| Cholesteryl oleate | 24 to 91 |
| Cholesteryl acetate | 2 to 21 |

By the regular behavior of the temperature response as the composition is varied, it may be seen that combinations of these constituents in the stated percentages are effective in scattering light over a broad range of colors in response to small temperature changes.

In the five pairs of curves shown in FIGURE 1 the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

The color-temperature behavior of a series of mixtures of cholesteryl octanoate, cholesteryl oleate, and cholesteryl acetate are shown in FIGURE 1. By varying the percent of cholesteryl octanoate and/or the amounts of cholesteryl acetate and oleate, a mixture of materials can be derived which scatters light selectively over the temperatures demonstrated in the curves. The amounts of the various constituents found to produce light scattering over useful temperature increments are:

|  | Percentage by wt. |
|---|---|
| Cholesteryl octanoate | 0 to 70 |
| Cholesteryl oleate | 24 to 91 |
| Cholesteryl acetate | 2 to 21 |

By the regular behavior of the temperature response as the composition is varied, it may be seen that combinations of these constituents in the stated percentages are effective in scattering light over a broad range of colors in response to small temperature changes.

In the five pairs of curves shown in FIGURE 1 the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

The color-temperature behavior of a series of mixtures of cholesteryl decanoate, cholesteryl oleate, and cholesteryl acetate are shown in FIGURE 1. By varying the percent of cholesteryl decanoate and/or the amounts of cholesteryl acetate and oleate, a mixture of materials can be derived which scatters light selectively over the temperatures demonstrated in the curves. The amounts of the various constituents found to produce light scattering over useful temperature increments are:

|  | Percentage by wt. |
|---|---|
| Cholesteryl decanoate | 0 to 70 |
| Cholesteryl oleate | 24 to 91 |
| Cholesteryl acetate | 2 to 21 |

By the regular behavior of the temperature response as the composition is varied, it may be seen that combinations of these constituents in the stated percentages are effective in scattering light over a broad range of colors in response to small temperature changes.

In the five pairs of curves shown in FIGURE 1 the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

The color-temperature behavior of a series of mixtures of cholesteryl nonanoate, cholesteryl oleate, and cholesteryl propionate are shown in FIGURE 4. By varying the percent of cholesteryl nonanoate and/or the amounts of cholesteryl oleate and propionate, a mixture of materials can be derived which scatters light selectively over the temperatures demonstrated in the curves. The amounts of the various constituents found to produce light scattering over useful temperature increments are:

|  | Percentage by wt. |
|---|---|
| Cholesteryl nonanoate | 0 to 70 |
| Cholesteryl oleate | 24 to 91 |
| Cholesteryl propionate | 2 to 21 |

By the regular behavior of the temperature response as the composition is varied, it may be seen that combinations of these constituents in the stated percentages are effective in scattering light over a broad range of colors in response to small temperature changes.

In the five pairs of curves shown in FIGURE 4 the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

The color-temperature behavior of a series of mixtures of cholesteryl octanoate, cholesteryl oleate, and cholesteryl propionate are shown in FIGURE 4. By varying the percent of cholesteryl octanoate, and/or the amounts of cholesteryl oleate and propionate, a mixture of materials can be derived which scatters light selectively over the temperatures demonstrated in the curves. The amounts of the various constituents found to produce light scattering over useful temperature increments are:

|  | Percentage by wt. |
|---|---|
| Cholesteryl octanoate | 0 to 70 |
| Cholesteryl oleate | 24 to 91 |
| Cholesteryl propionate | 2 to 21 |

By the regular behavior of the temperature response as the composition is varied, it may be seen that combinations of these constituents in the stated percentages are effective in scattering light over a broad range of colors in response to small temperature changes.

In the five paris of curves shown in FIGURE 4 the dashed lines represent the temperature at which red scattering commences. As the temperature is increased, light is scattered successively in the orange, yellow, green, blue, and violet regions of the visible spectrum. The solid lines in the figure refer to the temperatures at which blue scatering is observed.

The color-temperature behavior of a series of mixtures of cholesteryl decanoate, cholesteryl oleate, and cholesteryl propionate are shown in FIGURE 4. By varying the percent of cholesteryl decanoate and/or the amounts of cholesteryl oleate and propionate, a mixture of materials can be derived which scatters light selectively over the temperatures demonstrated in the curves. The amounts of the various constituents found to produce light scattering over useful temperature increments are:

|  | Percentage by wt. |
|---|---|
| Cholesteryl decanoate | 0 to 70 |
| Cholesteryl oleate | 24 to 91 |
| Cholesteryl propionate | 2 to 21 |

By the regular behavior of the temperature response as the composition is varied, it may be seen that combinations of these constituents in the stated percentages are effective in scattering light over a broad range of colors in response to small temperature changes.

In the five pairs of curves shown in FIGURE 4 the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

The color-temperature behavior of a series of mixtures of cholesteryl nonanoate, cholesteryl oleate, and cholesteryl acetate are shown in FIGURE 2. By varying the percent of cholesteryl nonanoate and/or the amounts of cholesteryl oleate and acetate, a mixture of materials can be derived which scatters light selectively over the temperatures demonstrated in the curves. The amounts of the various constituents found to produce light scattering over useful temperature increments are:

|  | Percentage by wt. |
|---|---|
| Cholesteryl nonanoate | 40 to 50 |
| Cholesteryl oleate | 34 to 47 |
| Cholesteryl acetate | 11 to 20 |

By the regular behavior of the temperature response as the composition is varied, it may be seen that combinations of these constituents in the stated percentages are effective in scattering light over a broad range of colors in response to small temperature changes.

In the two pairs of curves shown in FIGURE 2 the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

The color-temperature behavior of a series of mixtures of cholesteryl octanoate, cholesteryl oleate, and cholesteryl acetate are shown in FIGURE 2. By varying the percent of cholesteryl octanoate, and/or the amounts of cholesteryl oleate and acetate, a mixture of materials can be derived which scatters light selectively over the temperatures demonstrated in the curves. The amounts of the various constituents found to produce light scattering over useful temperature increments are:

|  | Percentage by wt. |
|---|---|
| Cholesteryl octanoate | 40 to 50 |
| Cholesteryl oleate | 34 to 47 |
| Cholesteryl acetate | 11 to 20 |

By the regular behavior of the temperature response as the composition is varied, it may be seen that combinations of these constituents in the stated percentages are effective in scattering light over a broad range of colors in response to small temperature changes.

In the two pairs of curves shown in FIGURE 2 the dashed lines represent the temperatures at which red scattering commences. As the temperature is increased, light is scattered successively in the orange, yellow, green, blue, and violet regions of the visible spectrum. The solid lines in the figure refer to the temperatures at which blue seattering is observed.

The color-temperature behavior of a series of mixtures of cholesteryl decanoate, cholesteryl oleate, and cholesteryl acetate are shown in FIGURE 2. By varying the percent of cholesteryl decanoate and/or the amounts of cholesteryl oleate and acetate, a mixture of materials can be derived which scatters light selectively over the temperatures demonstrated in the curves. The amounts of the various constituents found to produce light scattering over useful temperature increments are:

| | Percentage by wt. |
|---|---|
| Cholesteryl decanoate | 40 to 50 |
| Cholesteryl oleate | 34 to 47 |
| Cholesteryl acetate | 11 to 20 |

By the regular behavior of the temperature response as the composition is varied, it may be seen that combinations of these constituents in the stated percentages are effective in scattering light over a broad range of colors in response to small temperature changes.

In the two pairs of curves shown in FIGURE 2, the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

The color-temperature behavior of a series of mixtures of cholesteryl nonanoate, cholesteryl oleate, and cholesteryl acetate are shown in FIGURE 2. By varying the percent of cholesteryl nonanoate and/or the amounts of cholesteryl oleate and propionate, a mixture of materials can be derived which scatters light selectively over the temperatures demonstrated in the curves. The amounts of the various constituents found to produce light scattering over useful temperature increments are:

| | Percentage by wt. |
|---|---|
| Cholesteryl nonanoate | 40 to 50 |
| Cholesteryl oleate | 34 to 47 |
| Cholesteryl propionate | 11 to 20 |

By the regular behavior of the temperature response as the composition is varied, it may be seen that combinations of these constituents in the stated percentages are effective in scattering light over a broad range of colors in response to small temperature changes.

In the two pairs of curves shown in FIGURE 2, the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

The color-temperature behavior of a series of mixtures of cholesteryl nonanoate, cholesteryl oleate, and cholesteryl propionate are shown in FIGURE 2. By varying the percent of cholesteryl nonanoate and/or the amounts of cholesteryl oleate and propionate, a mixture of materials can be derived which scatters light selectively over the temperatures demonstrated in the curves. The amounts of the various constituents found to produce light scattering over useful temperature increments are:

| | Percentage by wt. |
|---|---|
| Cholesteryl decanoate | 40 to 50 |
| Cholesteryl oleate | 34 to 47 |
| Cholesteryl propionate | 11 to 20 |

By the regular behavior of the temperature response as the composition is varied, it may be seen that combinations of these constituents in the stated percentages are effective in scattering light over a broad range of colors in response to small temperature changes.

In the two pairs of curves shown in FIGURE 2, the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

The color-temperature behavior of a series of mixtures of cholesteryl octanoate, cholesteryl oleate, and cholesteryl propionate are shown in FIGURE 2. By varying the percent of cholesteryl octanoate and/or the amounts of cholesteryl oleate and propionate, a mixture of materials can be derived which scatters light selectively over the temperatures demonstrated in the curves. The amounts of the various constituents found to produce light scattering over useful temperature increments are:

| | Percentage by wt. |
|---|---|
| Cholesteryl octanoate | 40 to 50 |
| Cholesteryl oleate | 34 to 47 |
| Cholesteryl propionate | 11 to 20 |

By the regular behavior of the temperature response as the composition is varied, it may be seen that combinations of these constituents in the stated percentages are effective in scattering light over a broad range of colors in response to small temperature changes.

In the two pairs of curves shown in FIGURE 2 the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

The color-temperature behavior of a series of mixtures of cholesteryl p-nitrobenzoate, cholesteryl oleate, and cholesteryl acetate are shown in FIGURE 3. By varying the percent of cholesteryl p-nitrobenzoate and/or the amounts of cholesteryl oleate and acetate, a mixture of materials can be derived which scatters light selectively over the temperatures demonstated in the curves. The amounts of the various constituents found to produce light scattering over useful temperature increments are:

| | Percentage by wt. |
|---|---|
| Cholesteryl p-nitrobenzoate | 1 to 4 |
| Cholesteryl oleate | 80 to 91 |
| Cholesteryl acetate | 5 to 15 |

By the regular behavior of the temperature response as the composition is varied, it may be seen that combinations of these constituents in the stated percentages are effective in scattering light over a broad range of colors in response to small temperature changes.

In the two pairs of curves shown in FIGURE 3, the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

The color-temperature behavior of a series of mixtures of cholesteryl p-nitrobenzoate, cholesteryl oleate, and cholesteryl propionate are shown in FIGURE 3. By varying the percent of cholesteryl p-nitrobenzoate and/or the amounts of cholesteryl oleate and priopionate, a mixture of materials can be derived which scatters light selectively over the temperatures demonstrated in the curves. The amounts of the various constituents found to produce light scattering over useful temperature increments are:

| | Percentage by wt. |
|---|---|
| Cholesteryl p-nitrobenzoate | 1 to 4 |
| Cholesteryl oleate | 80 to 91 |
| Cholesteryl propionate | 5 to 16 |

By the regular behavior of the temperaure response as the composition is varied, it may be seen that combinations of these constituents in the stated percentages are effective in scattering light over a broad range of colors in response to small temperature changes.

In the two pairs of curves shown in FIGURE 3, the dashed lines represent the temperatures at which red scattering commences. As the temperature is increased, light is scattered successively in the orange, yellow, green, blue, and violet regions of the visible spectrum. The solid lines in the figure refer to the temperatures at which blue scattering is observed.

In addition to the above compositions, I have further improved their response and distinctive color patterns by making an addition of a filler material selected from the group consisting of carbon, carbon black, black tempera powder, finely divided metals, finely divided nonmetals and combinations thereof. Examples of finely divided metals and nonmetals which have been successfully embodied are nickel, molybdenum and silicon. Typical but not limiting particle sizes have been used from a range of 100 mesh to 500 mesh by the Tyler Screen Classification System. It has been found that an addition of an opaque filler material selected from the above group, when incorporated into a liquid cholesteric material according to the above compositions in the range of 3.0% to 30.0% by weight brings an improvement in their application for temperature visualization on reflective and nonreflective surfaces (e.g., metal surfaces and human skin respectively) and transparent materials (e.g., glass, Plexiglas and plastic). The incorporation of the filler eliminates using a black paint background, thus eliminating the above-mentioned problems associated with this black paint background.

I have also successfully employed the addition of a filler in a one component cholesteryl material and a two component cholesteryl material with the result of eliminating any need for any black opaque background. The above-mentioned range of 3.0% to 30.0% by weight of the above-mentioned fillers was successfully incorporated into a cholesteryl oleate. The addition led to selective light scattering without any need of an opaque background. The 3.0% to 30.0% by weight range of the above-mentioned fillers was successfully incorporated into a two component cholesteryl material of varying proportions of cholesteryl oleate and cholesteryl nonanoate. The filler additions have also been successfully incorporated into multicomponent cholesteryl materials (3 or more components).

It has been observed that filler additions below 3.0% by weight do not have the degree of effectiveness for creating efficient visual delineation. Additions of filler above 30.0% by weight have the effect of darkening the cholesteryl medium thus decreasing visual delineation of the color patterns to the eventual point of making the color patterns indistinguishable.

Several methods can be employed to incorporate the filler material into the particular cholesteric composition being employed. For instance, manual stirring or mechanical mixing can be successfully utilized.

Liquid crystals, particularly with filler added, provide a rapid and very sensitive means of mapping human skin temperatures. The darkened cholesteric materials are especially useful in applications where movement of the skin, as around joints, normally causes cracking of underlying black background paints. Several studies have been conducted in a variety of medical fields. Pediatricians are evaluating these materials as remote temperature indicators on infants in incubators. In a normal infant, the feet should be about 1° C. below the abdomen temperature. By placing liquid crystal layers on both of these areas of the infant, the respective temperatures of each area are quickly indicated. If the relative temperature difference increases beyond this, it may be an indication of an infectious disease causing vasoconstriction. If the relative temperatures are less than a degree apart, the incubator may be too warm.

The temperature indications provided by the materials set forth above reflect when vein grafts have successfully restored circulation to the extremities. The success of removal of arterial blockage is also reflected by the increase in temperature over arteries lying close to the skin. If the temperature rise does not occur, it is likely that the blood vessel has not been completely opened. The efficiency of vascular activity at sutures, skin flaps, and wounds after surgery may also be indicated by skin temperature patterns. A plastic surgeon is studying this as a means of reducing the waiting time before commencing second-stage constructive surgery.

The damage to blood vessels in areas of second and third degree burns may produce localized temperature anomalies visible by liquid crystals. To prevent infection in areas of severe burns, a common practice is to apply silver nitrate to the area. This darkens the skin and makes visual examination of the burned tissue difficult. With layers of cholesteric materials applied to small controlled areas of third degree burns in laboratory animals, we have accurately outlined the extent of severe burning due to an appreciably lower temperature indication over these areas. This would enable early removal of the tissue in the third degree areas and allow grafting to commence shortly afterwards. As above noted, these applications are not currently possible with cholesteric materials which require an opaque background.

Many applications and utilizations of the composition set forth in this invention have been found. A liquid crystal composition can be employed effectively to test adhesive bonding honeycomb structures for various faults and flaws in the fabrication of the structure. Similar inspection of electronic components can be conducted to detect flaws and failures in fabrication. Further, the attractive color patterns of very precise delineation prove useful in several areas for their decorative, intrigue and colorfulness. Such areas include decorative panels for offices and aircraft interiors and toys which have psychological attractiveness to children because of their variety of color display when touched by a human hand.

To fabricate a toy or a decorative color panel, we have applied approximately 0.5 gram of any of the above compositions, with filler additions, to a sheet of clear acetate, Mylar or Plexiglas typically by spreading the cholesteryl medium by manual means. A second sheet of clear film material is placed over the clear sheet coated with the mixture. The sandwich is then placed between two metal blocks of approximately the same area as the sandwich. These blocks are heated to approximately 40–50° C. and exert a force of an order of 5 lbs. on the sandwich. The metal blocks on the sandwich are then placed in a vacuum of about 10 mm. Hg. After about one minute at this pressure, air is admitted to the chamber rapidly. The above procedure has been successful in producing a thin, uniform film of liquid crystals sandwiched between the protective layers mentioned above. To prevent slippage of the protective layers, we have investigated the following methods of sealing, any of which would be feasible with the above-mentioned materials: (a) tape, (b) adhesive, (c) ultrasonic sealing and (d) thermal sealing. Another method of sealing the toy makes use of a sandwich of vinyl materials sealed on three edges. An excess of liquid crystal material is injected into the envelope at the narrow end which remains open. The sandwich is then passed between variable pressure rolls heated to 40–50° C. This forces the air out of the envelope and spreads the liquid crystals uniformly. The open end of the envelope is then sealed thermally to close the container. This has worked quite well with small test samples and can be readily adapted to large scale productions.

Large sandwiches of compositions of the liquid crystals set forth above can be made using very thin (0.001 inch) film to permit inspection of surfaces without necessity of painting the surfaces with liquid crystal compositions. To produce these thin films, I use a vacuum frame to draw Saran wrap or Teflon film very tight and then paint the composition of liquid crystal upon the Saran wrap or Teflon film. The first Saran wrap or Teflon film is then cut to the inner dimensions of the vacuum frame and a second film is placed on the frame. When the frame is reevacuated, the second film is pressed against the liquid crystalline composition and forms an air-free sandwich.

The sandwich can then be placed on a surface to reinspect it and reuse repeatedly.

Essentially the same process has been used in preparing larger panels of Plexiglas with the above compostions of liquid crystals deposited between the cover sheets thereof. By selectively or randomly heating portions of the panels, some very artistic effects can be gained from the color patterns exhibited by the panels.

I claim:

1. A composition of matter having thermal color responsive characteristics and sharp delineation between colors in the thermal pattern consisting of:

| | Percentage by wt. |
|---|---|
| Cholesteryl nonanoate | 0 to 70 |
| Cholesteryl oleate | 24 to 91 |
| Cholesteryl acetate | 2 to 21 |

2. A composition of matter as set forth in claim 1 additionally containing an opaque filler material.

3. A composition of matter having thermal color responsive characteristics and sharp delineation between colors in the thermal pattern consisting of:

| | Percentage by wt. |
|---|---|
| Cholesteryl octanoate | 0 to 70 |
| Cholesteryl oleate | 24.0 to 91 |
| Cholesteryl acetate | 2 to 21 |

4. A composition of matter as set forth in claim 3 additionally containing an opaque filler material.

5. A composition of matter having thermal color responsive characteristics and sharp delineation between colors in the thermal pattern consisting of:

| | Percentage by wt. |
|---|---|
| Cholesteryl decanoate | 0 to 70 |
| Cholesteryl oleate | 24 to 91 |
| Cholesteryl acetate | 2 to 21 |

6. A composition of matter as set forth in claim 5 additionally containing an opaque filler material.

7. A composition of matter having thermal color responsive characteristics and sharp delineation between colors in the thermal pattern consisting of:

| | Percentage by wt. |
|---|---|
| Cholesteryl nonanoate | 0 to 70 |
| Cholesteryl oleate | 24 to 91 |
| Cholesteryl propionate | 2 to 21 |

8. A composition of matter as set forth in claim 7 additionally containing an opaque filler material.

9. A composition of matter having thermal color responsive characteristics and sharp delineation between colors in the thermal pattern consisting of:

| | Percentage by wt. |
|---|---|
| Cholesteryl octanoate | 0 to 70 |
| Cholesteryl oleate | 24 to 91 |
| Cholesteryl propionate | 2 to 21 |

10. A composition of matter as set forth in claim 9 additionally containing an opaque filler material.

11. A compostion of matter having thermal color responsive characteristics and sharp delineation between colors in the thermal pattern consisting of:

| | Percentage by wt. |
|---|---|
| Cholesteryl decanoate | 0 to 70 |
| Cholesteryl oleate | 24 to 91 |
| Cholesteryl propionate | 2 to 21 |

12. A compostion of matter as set forth in claim 11 additionally containing an opaque filler material.

13. A compostion of matter having thermal color responsive characteristics and sharp delineation between colors in the thermal pattern consisting of:

| | Percentage by wt. |
|---|---|
| Cholesteryl p-nitrobenzoate | 1 to 4 |
| Cholesteryl oleate | 80 to 91 |
| Cholesteryl acetate | 5 to 16 |

14. A composition of matter as set forth in claim 13 additionally containing an opaque filler material.

15. A compostion of matter having thermal color responsive characteristics and sharp delineation between colors in the thermal pattern consisting of:

| | Percentage by wt. |
|---|---|
| Cholesteryl p-nitrobenzoate | 1 to 4 |
| Cholesteryl oleate | 80 to 91 |
| Cholesteryl propionate | 5 to 16 |

16. A composition of matter as set forth in claim 15 additionally containing an opaque filler material.

17. A three component cholesteric compostion consisting essentially of 24–91 percentage by weight of a first component of cholesteryl oleate; 0–70 percentage by weight of a second component selected from the group consisting of cholesteryl nonanoate, cholesteryl decanoate, cholesteryl octanoate, cholesteryl paranitrobenzoate and combinations thereof; and 2–21 percentage by weight of a third component selected from the group consisting of cholesteryl acetate, cholesteryl propionate and combinations thereof.

18. A cholesteric compostion as set forth in claim 17 additionally containing an opaque filler material.

References Cited

UNITED STATES PATENTS

| 3,014,301 | 12/1961 | Grupe | 161—6 |
| 3,114,836 | 12/1963 | Fergason et al. | 250—83 |
| 3,309,257 | 3/1967 | Borack | 161—6 |

MAYER WEINBLATT, *Primary Examiner.*

U.S. Cl. X.R.

167—36.7; 23—230; 161—6, 410; 250—83